(12) United States Patent
Chen et al.

(10) Patent No.: US 10,198,123 B2
(45) Date of Patent: Feb. 5, 2019

(54) MITIGATING NOISE IN CAPACITIVE SENSOR

(71) Applicant: Apple Inc., Cupertino, CA (US)

(72) Inventors: Cheng Chen, Cupertino, CA (US); Erik A. Uttermann, Cupertino, CA (US); Kevin D. Gibbs, Cupertino, CA (US); Manu Agarwal, Cupertino, CA (US); Martin P. Grunthaner, Cupertino, CA (US)

(73) Assignee: Apple Inc., Cupertino, CA (US)

(*) Notice: Subject to any disclaimer, the term of this patent is extended or adjusted under 35 U.S.C. 154(b) by 302 days.

(21) Appl. No.: 15/306,054

(22) PCT Filed: Apr. 21, 2014

(86) PCT No.: PCT/US2014/034817
§ 371 (c)(1),
(2) Date: Oct. 21, 2016

(87) PCT Pub. No.: WO2015/163843
PCT Pub. Date: Oct. 29, 2015

(65) Prior Publication Data
US 2017/0046008 A1    Feb. 16, 2017

(51) Int. Cl.
*G06F 3/041* (2006.01)
*G06F 3/044* (2006.01)
(Continued)

(52) U.S. Cl.
CPC ........ *G06F 3/0418* (2013.01); *G02F 1/13338* (2013.01); *G06F 3/044* (2013.01);
(Continued)

(58) Field of Classification Search
CPC ........... G02F 1/13338; G02F 1/133514; G02F 1/133528; G02F 1/13439; G02F 1/1368;
(Continued)

(56) References Cited

U.S. PATENT DOCUMENTS

| 4,527,862 A | 7/1985 | Arakawa |
| 5,343,064 A | 8/1994 | Spangler et al. |

(Continued)

FOREIGN PATENT DOCUMENTS

| CN | 1502166 | 6/2004 |
| CN | 1577385 | 2/2005 |

(Continued)

OTHER PUBLICATIONS

International Search Report and Written Opinion dated Sep. 1, 2014, PCT/US2014/034817, 13 pages.
(Continued)

*Primary Examiner* — Amare Mengistu
*Assistant Examiner* — Crystal A Mathews
(74) *Attorney, Agent, or Firm* — Brownstein Hyatt Farber Schreck, LLP

(57) ABSTRACT

The disclosed embodiments relate to forming an area on a touchscreen which electrically isolates a portion of the viewable area of the touchscreen from a capacitive sensor associated with the touchscreen.

14 Claims, 9 Drawing Sheets

(51) Int. Cl.
*G02F 1/1333* (2006.01)
*G02F 1/1335* (2006.01)
*G02F 1/1343* (2006.01)
*G02F 1/1368* (2006.01)

(52) U.S. Cl.
CPC .......... *G06F 3/0414* (2013.01); *G02F 1/1368* (2013.01); *G02F 1/13439* (2013.01); *G02F 1/133514* (2013.01); *G02F 1/133528* (2013.01); *G02F 2001/133302* (2013.01); *G02F 2201/121* (2013.01); *G06F 2203/04103* (2013.01); *G06F 2203/04106* (2013.01); *G06F 2203/04107* (2013.01)

(58) Field of Classification Search
CPC ...... G06F 3/0418; G06F 3/0414; G06F 3/044; G06F 2203/04103; G06F 2203/04106; G06F 2203/04107
See application file for complete search history.

(56) References Cited

U.S. PATENT DOCUMENTS

| | | |
|---|---|---|
| 5,929,517 A | 7/1999 | Distefano et al. |
| 6,002,389 A | 12/1999 | Kasser |
| 6,079,282 A | 6/2000 | Lanter |
| 6,154,580 A | 11/2000 | Kuriyama et al. |
| 6,323,846 B1 | 11/2001 | Westerman et al. |
| 6,545,495 B2 | 4/2003 | Warmack et al. |
| 6,568,275 B2 | 5/2003 | Scholz et al. |
| 6,570,557 B1 | 5/2003 | Westerman et al. |
| 6,570,707 B1 | 5/2003 | Murakami |
| 6,676,611 B1 | 1/2004 | Bromba |
| 6,677,932 B1 | 1/2004 | Westerman |
| 6,989,728 B2 | 1/2006 | Van Zeeland et al. |
| 7,158,122 B2 | 1/2007 | Roberts |
| 7,211,885 B2 | 5/2007 | Nordal et al. |
| 7,337,085 B2 | 2/2008 | Soss |
| 7,409,876 B2 | 8/2008 | Ganapathi et al. |
| 7,511,702 B2 | 3/2009 | Hotelling |
| 7,538,760 B2 | 5/2009 | Hotelling et al. |
| 7,609,178 B2 | 10/2009 | Son et al. |
| 7,719,522 B2 | 5/2010 | Lyon et al. |
| 7,784,366 B2 | 8/2010 | Daverman et al. |
| 7,800,592 B2 | 9/2010 | Kerr et al. |
| 7,920,134 B2 | 4/2011 | Krah |
| 8,072,437 B2 | 12/2011 | Miller et al. |
| 8,111,248 B2 | 2/2012 | Lee et al. |
| 8,169,332 B2 | 5/2012 | Bernstein et al. |
| 8,169,416 B2 | 5/2012 | Han |
| 8,228,306 B2 | 7/2012 | Long |
| 8,253,711 B2 | 8/2012 | Kim et al. |
| 8,274,495 B2 | 9/2012 | Lee |
| 8,334,849 B2 | 12/2012 | Murphy et al. |
| 8,351,993 B2 | 1/2013 | Nunes |
| 8,390,481 B2 | 3/2013 | Pance et al. |
| 8,421,978 B2 | 4/2013 | Wang et al. |
| 8,436,823 B2 | 5/2013 | Kanehira et al. |
| 8,547,350 B2 | 10/2013 | Anglin et al. |
| 8,577,289 B2 | 11/2013 | Schlub et al. |
| 8,577,644 B1 | 11/2013 | Ksondzyk et al. |
| 8,633,916 B2 | 1/2014 | Bernstein et al. |
| 8,669,963 B2 | 3/2014 | Baker et al. |
| 8,704,787 B2 | 4/2014 | Yamamoto et al. |
| 8,711,122 B2 | 4/2014 | Wada et al. |
| 8,724,861 B1 | 5/2014 | Sun |
| 8,743,083 B2 | 6/2014 | Zanone et al. |
| 8,760,413 B2 | 6/2014 | Peterson et al. |
| 8,780,055 B2 | 7/2014 | Marchand et al. |
| 8,780,062 B2 | 7/2014 | Hibara et al. |
| 8,830,205 B2 | 9/2014 | Chang et al. |
| 8,913,031 B2 | 12/2014 | Honda et al. |
| 8,922,523 B2 | 12/2014 | Lynch et al. |
| 8,963,874 B2 | 2/2015 | Li et al. |
| 9,024,907 B2 | 5/2015 | Bolender |
| 9,030,440 B2 | 5/2015 | Pope et al. |
| 9,057,653 B2 | 6/2015 | Schediwy et al. |
| 9,088,282 B2 | 7/2015 | Holenarsipur et al. |
| 9,092,129 B2 | 7/2015 | Abdo et al. |
| 9,104,898 B2 | 8/2015 | Case |
| 9,116,569 B2 | 8/2015 | Stacy et al. |
| 9,207,134 B2 | 12/2015 | Ting et al. |
| 9,229,587 B2 | 1/2016 | Kawaguchi et al. |
| 9,235,645 B1 | 1/2016 | Ishizone et al. |
| 9,262,002 B2 | 2/2016 | Momeyer et al. |
| 9,354,752 B2 | 5/2016 | Kanehira et al. |
| 9,375,874 B2 | 6/2016 | Lin et al. |
| 9,390,308 B2 | 7/2016 | Mankowski et al. |
| 9,411,458 B2 | 8/2016 | Worfolk et al. |
| 9,430,102 B2 | 8/2016 | Prest et al. |
| 9,454,268 B2 | 9/2016 | Badaye et al. |
| 9,459,738 B2 | 10/2016 | Lin et al. |
| 9,477,342 B2 | 10/2016 | Daverman et al. |
| 9,494,473 B2 | 11/2016 | Hanson et al. |
| 9,541,578 B2 | 1/2017 | Shimata et al. |
| 9,542,589 B2 | 1/2017 | Thammasouk et al. |
| 9,671,889 B1 | 6/2017 | Miller et al. |
| 9,678,586 B2 | 6/2017 | Reynolds |
| 9,710,095 B2 | 7/2017 | Hotelling |
| 9,715,301 B2 | 7/2017 | Kuboyama et al. |
| 9,772,245 B2 | 9/2017 | Besling et al. |
| 9,851,828 B2 | 12/2017 | Richards et al. |
| 2006/0197753 A1 | 9/2006 | Hotelling |
| 2007/0030242 A1* | 2/2007 | Ito .................. G02B 6/0081 345/102 |
| 2007/0272919 A1 | 11/2007 | Mori et al. |
| 2008/0150901 A1 | 6/2008 | Lowles et al. |
| 2009/0015564 A1 | 1/2009 | Ye et al. |
| 2009/0066345 A1 | 3/2009 | Klauk et al. |
| 2009/0122021 A1* | 5/2009 | Liu .................. G02F 1/13338 345/173 |
| 2009/0237374 A1 | 9/2009 | Li et al. |
| 2010/0045628 A1 | 2/2010 | Gettemy et al. |
| 2010/0117989 A1 | 5/2010 | Chang |
| 2010/0123686 A1 | 5/2010 | Klinghult et al. |
| 2010/0220065 A1 | 9/2010 | Ma |
| 2011/0012845 A1 | 1/2011 | Rothkopf et al. |
| 2011/0037706 A1 | 2/2011 | Pasquero et al. |
| 2011/0080373 A1 | 4/2011 | Wang et al. |
| 2011/0096013 A1 | 4/2011 | Krumpelman et al. |
| 2011/0216016 A1 | 9/2011 | Rosener |
| 2011/0227872 A1 | 9/2011 | Huska et al. |
| 2011/0235156 A1 | 9/2011 | Kothari et al. |
| 2012/0038577 A1 | 2/2012 | Brown et al. |
| 2012/0086669 A1 | 4/2012 | Kim et al. |
| 2012/0089348 A1 | 4/2012 | Perlin et al. |
| 2012/0090757 A1 | 4/2012 | Buchan et al. |
| 2012/0098760 A1 | 4/2012 | Chuang |
| 2012/0098767 A1 | 4/2012 | Takai et al. |
| 2012/0104097 A1 | 5/2012 | Moran et al. |
| 2012/0169612 A1 | 7/2012 | Alameh et al. |
| 2012/0188202 A1 | 7/2012 | Tsujino et al. |
| 2012/0229417 A1 | 9/2012 | Badaye et al. |
| 2012/0274602 A1 | 11/2012 | Bita et al. |
| 2012/0313863 A1 | 12/2012 | Hsu |
| 2012/0319987 A1 | 12/2012 | Woo |
| 2013/0076375 A1 | 3/2013 | Hanumanthaiah et al. |
| 2013/0113732 A1 | 5/2013 | Kang et al. |
| 2013/0128416 A1 | 5/2013 | Weber |
| 2013/0176270 A1 | 7/2013 | Cattivelli et al. |
| 2013/0285973 A1 | 10/2013 | Elias et al. |
| 2013/0328575 A1 | 12/2013 | Ra et al. |
| 2014/0085213 A1 | 3/2014 | Huppi et al. |
| 2014/0085247 A1 | 3/2014 | Leung et al. |
| 2014/0111953 A1 | 4/2014 | McClure et al. |
| 2014/0152621 A1 | 6/2014 | Okayam et al. |
| 2015/0071509 A1 | 3/2015 | Myers |
| 2015/0130734 A1* | 5/2015 | Chang .................. G06F 3/044 345/173 |
| 2015/0135108 A1 | 5/2015 | Pope et al. |
| 2015/0153829 A1 | 6/2015 | Shiraishi |
| 2015/0185909 A1 | 7/2015 | Gecnuk |
| 2015/0185946 A1 | 7/2015 | Fourie |
| 2015/0370376 A1 | 12/2015 | Harley et al. |

(56) References Cited

U.S. PATENT DOCUMENTS

| | | | |
|---|---|---|---|
| 2015/0370396 A1 | 12/2015 | Ogata et al. | |
| 2016/0033342 A1 | 2/2016 | Lyon et al. | |
| 2016/0034088 A1 | 2/2016 | Richards et al. | |
| 2016/0041648 A1 | 2/2016 | Richards | |
| 2016/0042166 A1 | 2/2016 | Kang et al. | |
| 2016/0062498 A1 | 3/2016 | Huppi et al. | |
| 2016/0070404 A1 | 3/2016 | Kerr et al. | |
| 2016/0098131 A1 | 4/2016 | Ogata et al. | |
| 2016/0103542 A1 | 4/2016 | Ogata et al. | |
| 2016/0103544 A1 | 4/2016 | Filiz et al. | |
| 2016/0139716 A1 | 5/2016 | Filiz et al. | |
| 2016/0258981 A1 | 9/2016 | Bushnell et al. | |
| 2016/0314334 A1 | 10/2016 | He et al. | |
| 2016/0378255 A1 | 12/2016 | Butler et al. | |
| 2017/0038877 A1 | 2/2017 | Kuboyama et al. | |
| 2017/0235403 A1 | 8/2017 | Miller et al. | |
| 2017/0285746 A1 | 10/2017 | Kim et al. | |
| 2017/0322660 A1 | 11/2017 | Kuboyama et al. | |
| 2018/0048058 A1 | 2/2018 | Ehman et al. | |
| 2018/0069588 A1 | 3/2018 | Jiang et al. | |
| 2018/0088702 A1 | 3/2018 | Shutzberg et al. | |
| 2018/0138102 A1 | 5/2018 | Pan et al. | |

FOREIGN PATENT DOCUMENTS

| | | |
|---|---|---|
| CN | 1582453 | 2/2005 |
| CN | 1707415 | 12/2005 |
| CN | 1714336 | 12/2005 |
| CN | 101046720 | 10/2007 |
| CN | 101427468 | 5/2009 |
| CN | 101950224 | 1/2011 |
| CN | 102016780 | 4/2011 |
| CN | 201828892 | 5/2011 |
| CN | 102103445 | 6/2011 |
| CN | 102138120 | 7/2011 |
| CN | 102193699 | 9/2011 |
| CN | 102449583 | 5/2012 |
| CN | 102467308 | 5/2012 |
| CN | 102483673 | 5/2012 |
| CN | 204650590 | 9/2015 |
| EP | 2073107 | 6/2009 |
| EP | 2128747 | 12/2009 |
| EP | 2237142 | 10/2010 |
| EP | 2267791 | 12/2010 |
| EP | 2315102 | 4/2011 |
| EP | 2315186 | 4/2011 |
| EP | 2357547 | 8/2011 |
| EP | 2413224 | 2/2012 |
| EP | 2418561 | 2/2012 |
| EP | 2420918 | 2/2012 |
| EP | 2508960 | 10/2012 |
| EP | 2660688 | 11/2013 |
| EP | 2708985 | 3/2014 |
| GB | 2313195 | 11/1997 |
| JP | S61292732 | 12/1986 |
| JP | 2005031425 | 2/2005 |
| JP | 2007310539 | 11/2007 |
| JP | 2010225031 | 10/2010 |
| JP | 2010244252 | 10/2010 |
| JP | 2011100364 | 5/2011 |
| JP | 2014052997 | 3/2014 |
| KR | 1020100074005 | 7/2010 |
| WO | WO 97/018528 | 5/1997 |
| WO | WO 11/081882 | 7/2011 |
| WO | WO 11/156447 | 12/2011 |
| WO | WO 12/031564 | 3/2012 |
| WO | WO 12/147659 | 11/2012 |
| WO | WO 12/160844 | 11/2012 |
| WO | WO 13/083207 | 6/2013 |
| WO | WO 13/183191 | 12/2013 |
| WO | WO 14/018121 | 1/2014 |
| WO | WO 12/153555 | 7/2014 |
| WO | WO 14/124173 | 8/2014 |

OTHER PUBLICATIONS

Bau, et al., "TeslaTouch: Electrovibration for Touch Surfaces," UIST'10, Oct. 3-6, 2010, New York, New York USA, 10 pages.

Engineers Edge, Common Plastic Molding Design Material Specification, 2015, http://www.engineersedge.com/plastic/materials_common_plastic.htm, 3 pages.

Feist, "Samsung snags patent for new pressure sensitive touchscreens," posted on AndroidAuthority.com at URL: http://www.androidauthority.com/samsung-patent-pressure-sensitive-touchscreens-354860, Mar. 7, 2014, 1 page.

Widdle, "Measurement of the Poisson's ratio of flexible polyurethane foam and its influence on a uniaxial compression model," International Journal of Engineering Science, vol. 46, 2008, pp. 31-49.

\* cited by examiner

MITIGATING NOISE IN CAPACITIVE SENSOR

CROSS REFERENCE TO RELATED APPLICATION

This application is a 35 U.S.C. § 371 application of PCT/US2014/034817, filed on Apr. 21, 2014, and entitled "Mitigating Noise in Capacitive Sensor," which is incorporated by reference as if fully disclosed herein.

FIELD

The described embodiments relate generally to touchscreens and touch-sensitive devices. More particularly, the present embodiments relate to forming an area on a touchscreen which electrically isolates a portion of the viewable area of the touchscreen such that a user may use a portion of the screen as a touchscreen and another portion for viewing without electrical interference between the two portions.

BACKGROUND

A touchscreen is an electronic visual display that the user can control through simple or multi-touch gestures by touching the screen with one or more fingers. Some touchscreens can also be manipulated with other implements detect such as a stylus or ordinary or specially coated gloves. The user can use the touchscreen to react to what is displayed and to control how it is displayed (for example by zooming the text size). The touchscreen enables the user to interact directly with what is displayed, rather than using a mouse, touchpad, or any other intermediate device other than the optional stylus.

Touchscreens are common in devices such as game consoles, all-in-one computers, tablet computers, and smartphones. They can also be attached to computers or, as terminals, to networks. They also play a prominent role in the design of digital appliances such as personal digital assistants (PDAs), satellite navigation devices, mobile phones, and video games and some books. The popularity of smartphones, tablets, and many types of information appliances is driving the demand and acceptance of common touchscreens for portable and functional electronics. Touchscreens are found in the medical field and in heavy industry, as well as for automated teller machines (ATMs), and kiosks such as museum displays or room automation, where keyboard and mouse systems do not allow a suitably intuitive, rapid, or accurate interaction by the user with the display's content.

A capacitive touchscreen panel consists of an insulator such as glass, coated with a transparent conductor such as indium tin oxide (ITO). As the human body is also an electrical conductor, touching the surface of the screen results in a distortion of the screen's electrostatic field, measurable as a change in capacitance. When a user touches the surface, the system records the change in the electrical current that flows through the display. Different technologies may be used to determine the location of the touch. The location is then sent to the controller for processing. The controller interprets the command that the touch represents and communicates the command to the appropriate application in the electronic device.

SUMMARY

An embodiment is disclosed that includes an area on a touchscreen which is electrically isolated from a portion of the viewable area of the touchscreen such that the capacitive sensor associated with the touchscreen does not detect a change in capacitance generated when a user touches a portion of a non-sensing region of the touchscreen but does detect a change in capacitance generated when a user touches a reference plane portion of the touchscreen. In one embodiment the reference plane and viewable areas are formed on a surface of the liquid crystal display associated with the touchscreen. In another embodiment, the reference plane and viewable areas are formed on a surface of a transparent layer which may be affixed between a liquid crystal display and a capacitive array. In another embodiment, an electronic device including the touchscreen is disclosed.

An embodiment is disclosed including a method for making a touchscreen which includes depositing an optically transparent electrically conductive layer of material on the thin film transistor (TFT) layer of an LCD. A portion of the deposited layer is then removed, to electromagnetically isolate a reference plane area and a non-sensing region on the TFT layer. The reference plane area is electrically connected to the system such that the reference plane area is active and a user's touch may be sensed by the capacitive array. The liquid crystal display is affixed to a capacitive array to complete the touchscreen.

In another embodiment, a method is disclosed depositing an optically transparent electrically conductive layer of material on an optically transparent separate layer. A portion of the optically transparent electrically conductive layer of material is then removed to define a reference plane area and a non-sensing region as in the embodiment above. The reference plane area is electromagnetically connected to the system such that the reference plane area is active and a user's touch may be sensed by the capacitive array. The optically transparent layer is sandwiched between the LCD and the capacitive array to form the touchscreen.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. The embodiments are discussed below with reference to FIGS. 1-12. However, those skilled in the art will readily appreciate that the detailed description given herein with respect to these Figures is for explanatory purposes only and are not intended to limit the embodiments to one preferred embodiment. To the contrary, it is intended to cover alternatives, modifications, and equivalents as can be included within the spirit and scope of the described embodiments as defined by the appended claims.

Figure 1:
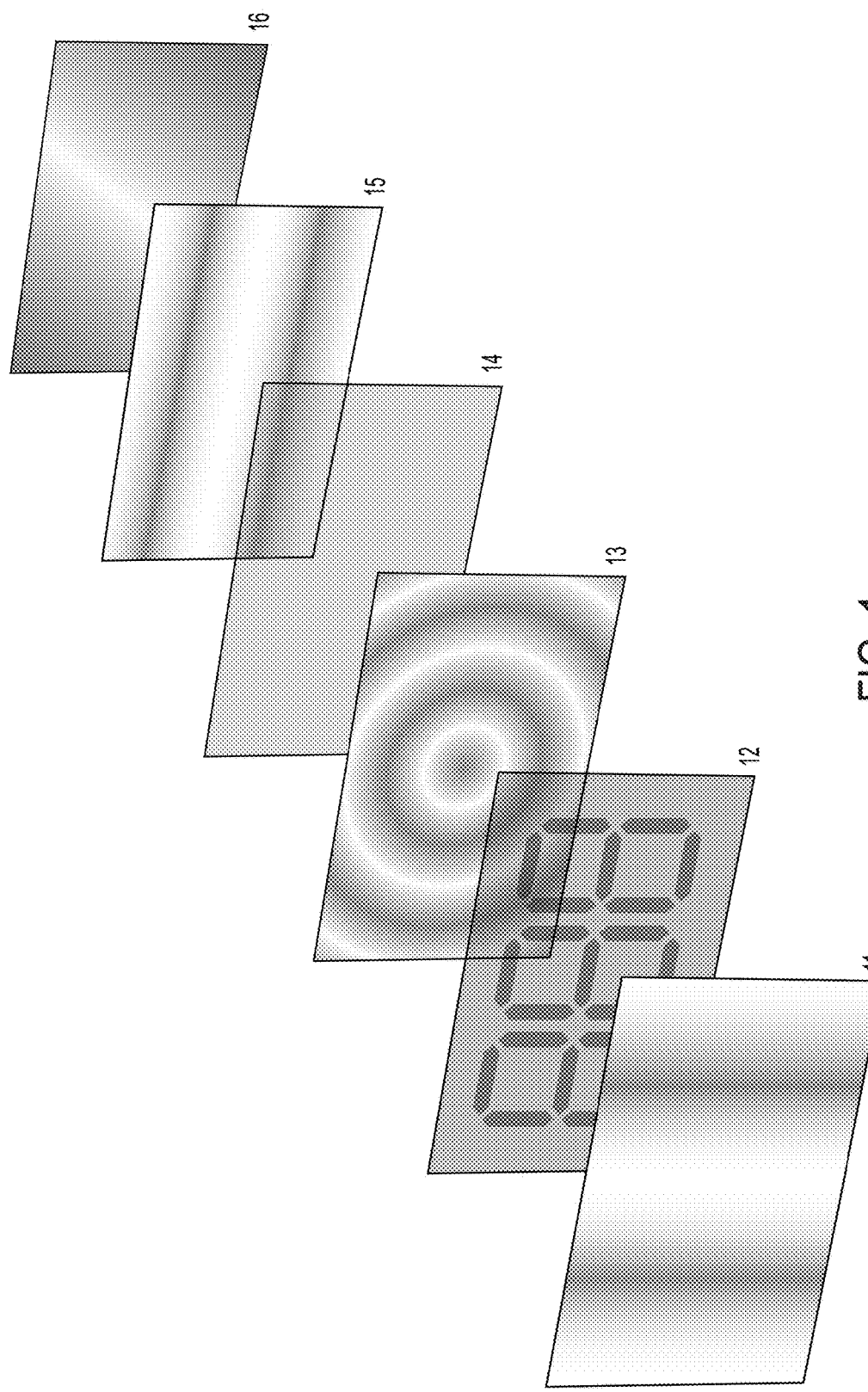
FIG. 1 shows a perspective view of a various layers of a conventional Liquid Crystal Display (LCD)

Referring to FIG. 1, the various layers forming a conventional Liquid Crystal Display (LCD) are shown in exploded view. A polarizing filter film 11 with a vertical axis to polarize light as it enters is shown adjacent to glass substrate 12 with Indium Tin Oxide (ITO) electrodes deposited thereon. Indium Tin Oxide is a useful transparent conducting oxide because it has two desirable properties, electrical conductivity and optical transparency. It can easily be deposited as a thin film by physical vapor deposition, electron beam evaporation or a variety of sputter deposition or other techniques.

When certain of the ITO electrodes in FIG. 1 are activated, they may determine the shapes that will appear on the LCD. In FIG. 1, the numbers 888 appear on layer 12 representing the activation of those corresponding electrodes when LCD is assembled and activated. Vertical ridges etched on the surface of 12 are parallel with the vertical polarizing layer 11. A liquid crystal layer 13 includes liquid crystals sandwiched between glass substrates 12 and 14. Glass substrate 14 includes common electrode film (ITO) with horizontal ridges to line up with a polarizing filter film 15, which has an orientation to block/pass light along a horizontal axis. A reflective surface 16 may be included to reflect light back to a viewer. In a backlit LCD, this layer 16 is replaced with a light source. Layers 11 through 16 may be affixed one to another to form a conventional liquid crystal display. Other LCD constructions may also be used in various embodiments of this disclosure.

In LCD operation, each pixel of the LCD consists of a layer of liquid crystal molecules aligned between two transparent electrode layers (12 and 14 in FIG. 1), and two polarizing filters. The axes of optical transmission of layers 11 and 15 are perpendicular to each other. Without the liquid crystal layer between the polarizing filters, light passing through the first filter may be blocked by the second (crossed) polarizer.

Liquid crystals do not allow light to pass uniformly along both axes of the crystals. Grooves are formed on the surface of both pieces of glass 12 and 14 at 90 degrees to one another. The molecules in liquid crystal layer 13 in-between line up in a helix. When light from the backlight or reflective layer 16 passes through the first polarizer and enters the sandwich it's rotated by the liquid crystals so as to allow it to pass through the second polarizer and emerge out the front of the screen. This is known as the normally white mode. Applying an electric field across the sandwich causes the crystals to line up lengthwise. The light that passes through the first polarizer is not rotated by the crystals and can no longer pass through the front of the screen which is referred to as black mode. By controlling the voltage between these transparent electrodes the intensity of the light that passes through can be controlled. By adding a color filter array layer, the transmitted light may be controlled so as to appear in various color wavelengths.

Figure 2:
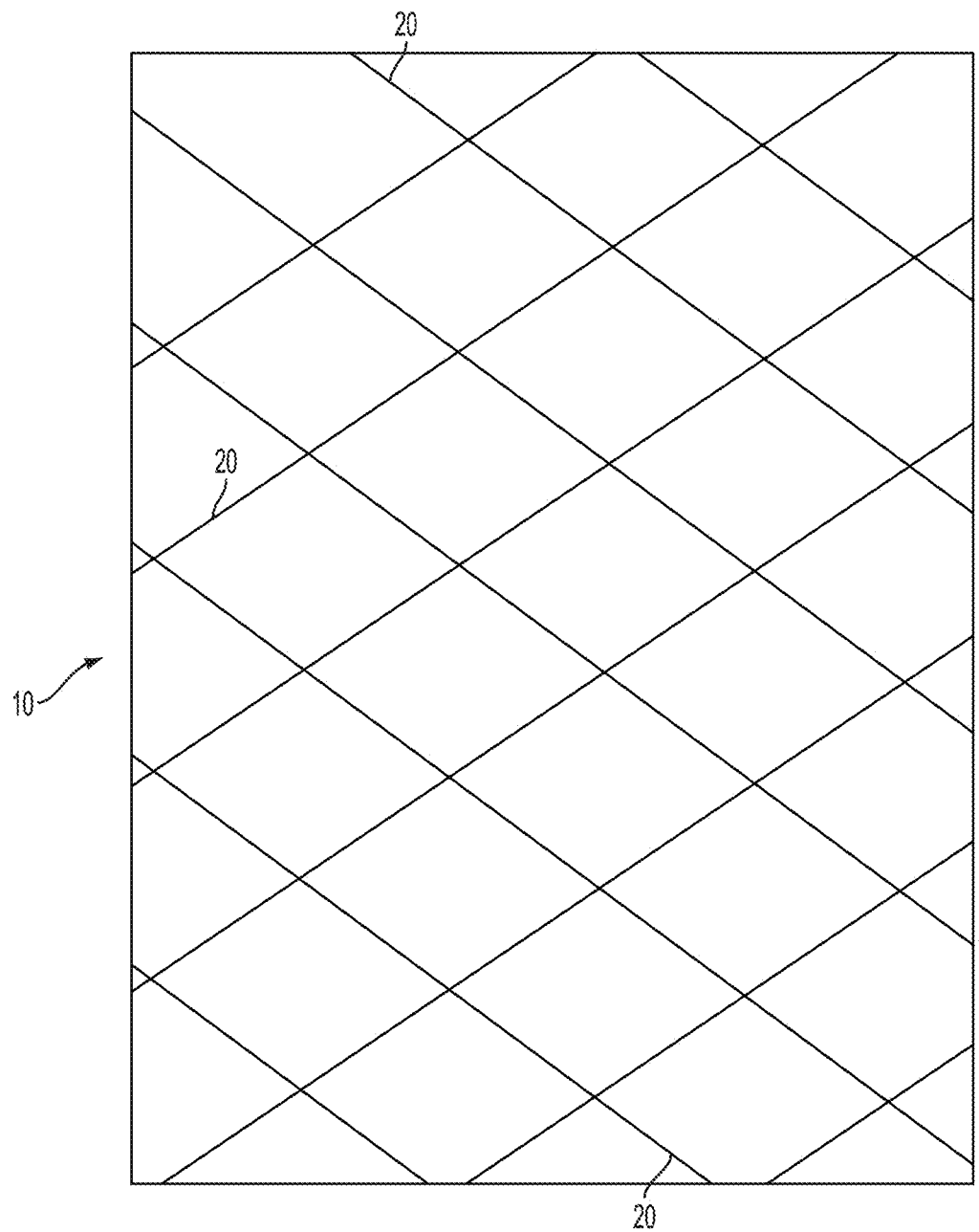
FIG. 2 shows a front view of a conventional capacitive array.

Many touchscreens include a capacitive sensing array to sense changes in electrostatic fields caused by movement of an electrical conductor from one sensor to another in the array. Typically, a mutual-capacitance capacitive sensing array includes two layers or sets of traces/lines formed from a conductive coating, which may be transparent (such as indium tin oxide). In some embodiments, the layers of the array may be formed on opposing surfaces with the layers separated by an adhesive spacer. In a mutual capacitance array there is a capacitor at every intersection of each row and column of the array. A voltage is applied to the rows and columns and by bringing a finger or a conductive stylus close to the surface of the array the local field changes which alters the mutual capacitance. The capacitance change at every individual point on the grid can be measured to accurately determine the touch location by measuring the voltage in the other axis. Mutual capacitance allows multi-touch operation where multiple fingers, palms or styli can be accurately tracked at the same time. Referring to FIG. 2 a capacitive array 10 is shown with intersecting conductive tracks 20 in a grid like arrangement with capacitors at the intersection of tracks 20.

Certain embodiments may use a mutual capacitance sensing array to correlate changes in capacitance to an input force, thereby sensing force in a non-binary fashion, in addition to or instead of sensing a touch. For example, a force exerted on a cover glass or other portion of a touchscreen 19 may cause local deformation of the touchscreen, thereby moving the upper and lower portions of the capacitive array closer to one another. This motion may generate a corresponding change in capacitance, insofar as a smaller distance separates the elements of the capacitive array and capacitance between two elements varies inversely with the square of the distance between the elements. Thus, a sensed change in capacitance may be indicative of, or correlated to, a force exerted on the touchscreen. The exact location of the force may be determined through the use of multiple force sensors spaced apart from one another, each of which may output a different change in capacitance in response to a force exerted in a local area. As one example, sensors closer to the location of a touch may detect a higher change in capacitance than sensors further away from the location of the touch. Alternately, a touch-sensing array may be used in addition to a force-sensing array in order to relatively precisely place the location of a touch.

Further, although capacitive sensing arrays described herein (such as the active reference planes discussed below) may be described in terms of mutual capacitance, the embodiments and concepts disclosed herein may operate equally with self-capacitive sensors.

Figure 3:
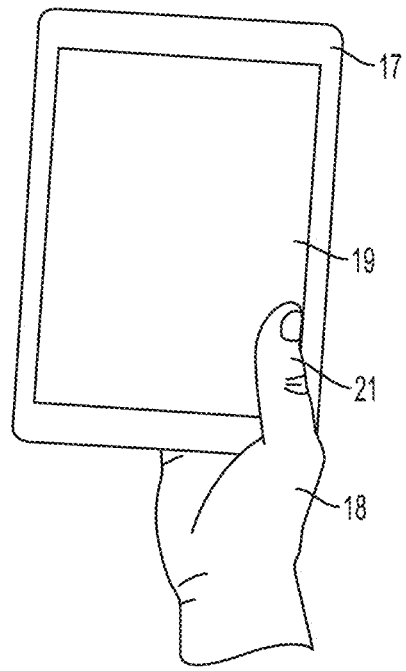
FIG. 3 shows a tablet computer held by a user.

Referring to FIG. 3, an electronic device, one example of which is a tablet 17, is shown held by a user 18. Tablet 17 includes a touchscreen 19 which may include a liquid crystal display as will be described below. User 18 may activate various applications or functions on touchscreen 19 by moving or touching finger 21 on appropriate portions of touchscreen 19. Thus, user 18 may be able to control the functions of tablet 17 without any additional equipment and without using his or her other hand. Alternatively, user 18 could hold tablet 17 with one hand and use fingers from his or her other hand to select functions or applications on touchscreen 19. Additional sample electronic devices that may incorporate a touchscreen and embodiments described herein include mobile telephones, computing displays, touch screens for appliances and/or home automation, in-vehicle displays, and so on. Further, embodiments may take the form of other touch-sensitive devices, such as track pads and other suitable input devices, and descriptions and disclosure herein may apply to such embodiments.

Figure 4:
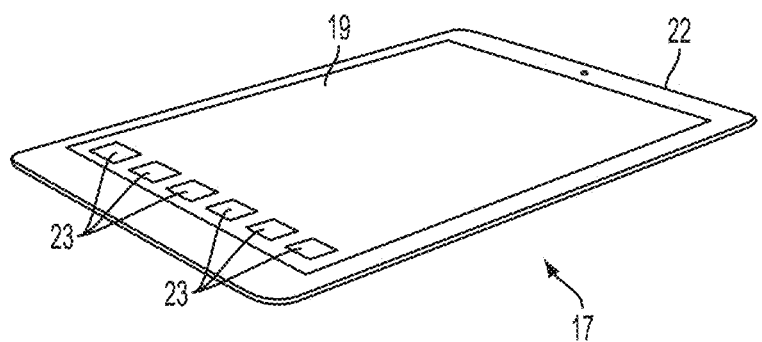
FIG. 4 shows a perspective view of a tablet including a touchscreen.

Referring to FIG. 4, tablet 17 includes touchscreen 19 as described above. Tablet 17 includes housing 22 which contains touchscreen 19. Touchscreen 19 may include a liquid crystal display, a cover glass overlying the display, and a capacitive array (not shown) behind the liquid crystal display. Various icons 23 appear on touchscreen 19 representing various applications or functions that may be accessed on tablet 17. The human body is an electrical conductor and by touching or moving finger 21 over icons 23, a touch may be measured as a change in capacitance detected by capacitor arrays located behind and in close proximity to the LCD and under the active viewing area of the LCD. The location of the user's finger 21 touch is sent to the controller (not shown) in tablet 17 for processing. The processor may thus determine which icon, and thus which application or function, user 18 has selected.

As stated above, the capacitive array is located in close proximity to and under the LCD. Capacitive array is also located adjacent to other electrical components in the electronic device. As such capacitive array is subject to exposure to electrical noise that could distort electrostatic fields, or capacitive measurements thereof, employed to sense a touch location. Similarly, the electrostatic fields generated by the capacitive array may distort the signals in liquid crystal display, which may result in visual artifacts visible to the user on touchscreen 19. It may be desirable to define and/or pattern various regions on, beneath, or related to the touchscreen 19 such that the signals from the capacitive array associated with the liquid crystal display and the signals from the display itself do not interfere with each other so as to distort the visual image to a user or to introduce errors into the location determination of the capacitive array.

Figure 5:
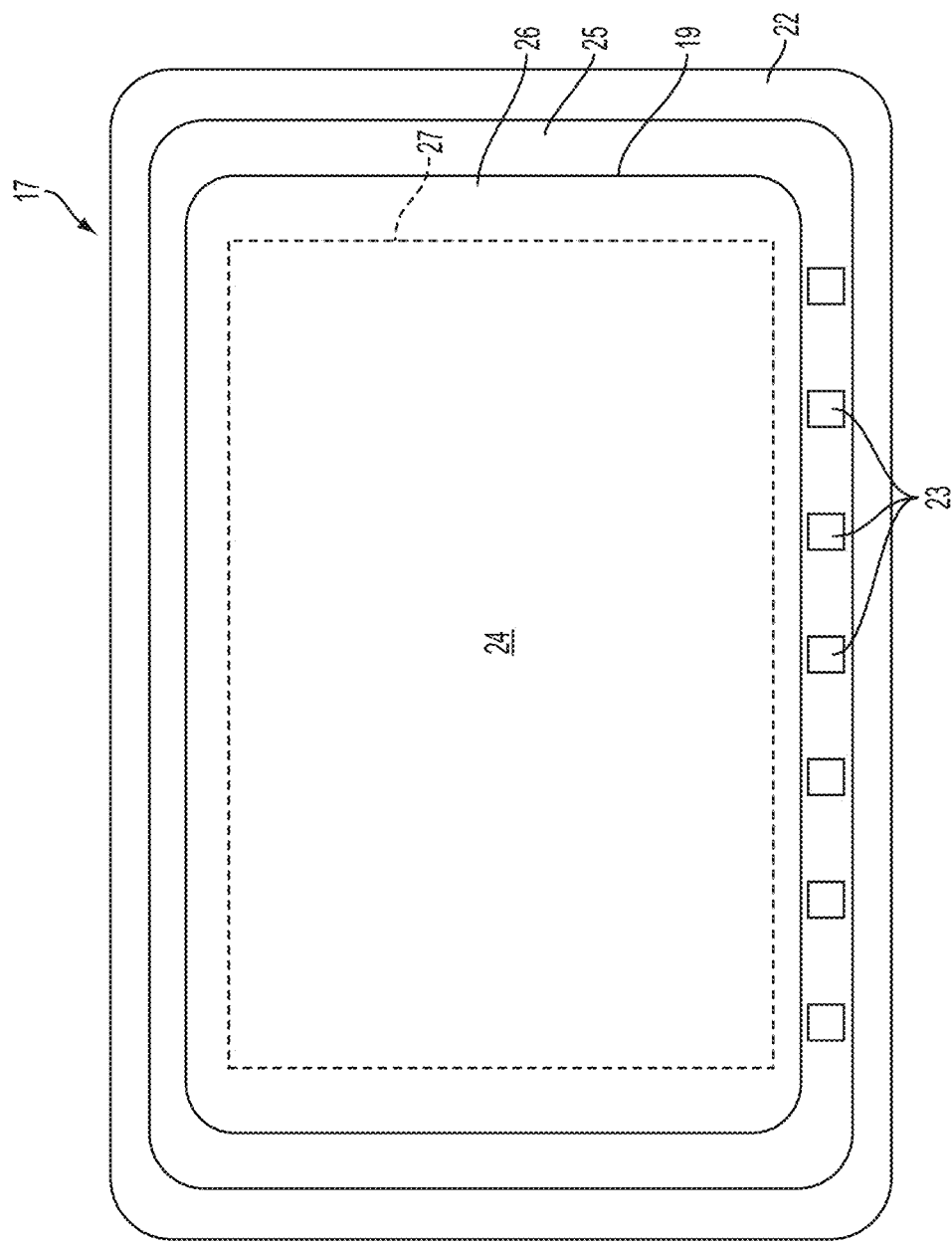
FIG. 5 shows a tablet with touchscreen including viewable and reference plane areas on the touchscreen.

Thus, in many applications of tablet 17, it may be advantageous to use only selected areas of touchscreen 19 as an active touch-sensing, or force-sensing, area. Referring to FIG. 5, tablet 17 is shown including touchscreen 19. Touchscreen 19 is mounted in housing 22. In one embodiment, touchscreen 19 includes a non-sensing region 24 surrounded by a capacitive sensing area 25 that is part of an active reference plane 26. (It should be noted that the demarcation of the capacitive sensing area 25 is shown in the figure for clarity, but such demarcation may not be visible on an electronic device; further, the capacitive sensing area 25 may be a portion of the touchscreen 19 in some embodiments.) That is, in this embodiment, non-sensing region 24 is electrically isolated from capacitive array behind the LCD screen such that the visual display on non-sensing region 24 does not include optical artifacts introduced by electrical interference from the capacitive array behind the LCD.

By limiting the area on touchscreen 19 on which the capacitive array senses a user's touch, force, or other input, certain economies may be achieved. For example, providing power to the entire viewable area of the LCD raises additional issues including higher resistance and increased coupling of display noise. By isolating non-sensing region 24, only the smaller area of the reference plane 26 requires power for the corresponding area of the capacitive array behind the screen. In addition, by limiting the areas of touchscreen 19 which serves as an "active" touchscreen area, certain aesthetic appeal is also achieved in that the displayed icons 23 do not interfere with the non-sensing region 24 and fingerprints or other residue left by user's finger 21 on the non-sensing region 24 may be reduced or eliminated.

In the embodiment shown in FIG. 5 user 18 may activate icons 23 on capacitive sensing area 25 around the perimeter of touchscreen 19. That is, icons 23 are only visible on area 25 and are not present on non-sensing region 24. If a user's finger 21 contacts non-sensing region 24 the capacitance of the finger is shielded from the capacitive array behind non-sensing region 24 and such contacts are thus not detected by the capacitive array; alternately, the finger may capacitively couple to the capacitive array but the array may not be electrically active, and thus may not generate any output. In capacitive sensing area 25 surrounding non-sensing region 24 there is no electrical shielding such that the capacitive load of the user's finger 21 contacting the force and/or touch capacitive sensing area 25 on touchscreen 19 is sensed by the capacitive array as described above.

Referring again to FIG. 5, the capacitive sensing area 25 is part of an active reference plane 26 (e.g., an active sensing region) that is generated by the electrical isolation of non-sensing region 24 from the capacitive array. The reference plane 26 is created from an optically transparent yet electrically conductive material as, for example, ITO or a silver nano wire matrix. Because available conductive materials create optical artifacts including but not limited to transmissive loss, color shift and reflection, the creation of the reference plane area 26 may be done with a uniform covering of the conductive material in the non-sensing region 24 of the LCD such that perceptible optical defects are not introduced and visible to the user 18 in the non-sensing region 24.

The portion of the non-sensing region excluding the active reference plane (e.g., the non-sensing region 24) may be patterned in a fashion similar to, or identical to, the patterning of the active reference plane but is typically electrically isolated from the active reference plane. Thus, this non-sensing region 24 may not be electrically powered even when the active reference plane 26 is powered.

The creation of the active reference plane area 26 and the non-sensing region 24 on touchscreen 19 results in an interface area 27 which is the boundary between reference plane area 26 and non-sensing region 24. The interface area 27 between non-sensing region 24 and active reference plane 26 may be made small enough to prevent artifacts that may otherwise be visible to a user 18 on touchscreen 19 in the interface area 27. In another embodiment, this interface area 27 may be designed such that, while visible artifacts are present, the entire screen is populated with regular artifacts such that the overall appearance of touchscreen 19 remains uniform to user 18. In another embodiment, interface area 27 could be designed so as to be decorative or definitive to provide a clear visual delineation between non-sensing region 24 and active reference plane 26. Likewise, the interface area 27 and its boundaries may not be visible from the exterior of the device and the shape of the interface area may vary from what is shown.

Referring to FIG. 5, the delineation of the interface area 27 between non-sensing region 24 and active reference plane 26 is shown. The active reference plane areas 26 of the conductive material behind the LCD display which are actively powered for use in the capacitive sensor array are electrically isolated from adjacent areas of conductive material under viewable area 24. In one embodiment, the patterned conductive layer may be a layer of ITO or other conductive material located between LCD and the capacitive array.

Figure 6:
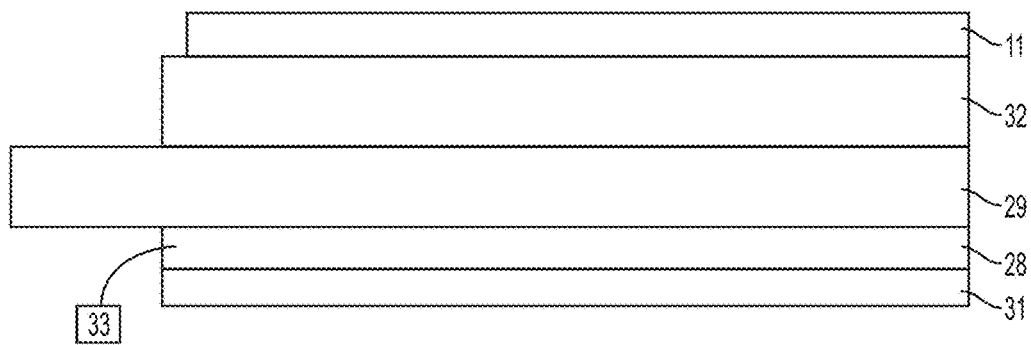
FIG. 6 shows a side view of an LCD including one embodiment of an optically transparent electrically conductive layer on a thin film transistor layer of the LCD.

Referring to FIG. 6, in one embodiment a side view of an LCD assembly is shown, such as may be assembled in or incorporated into a suitable electronic device (although the device housing is omitted for simplicity). It should be appreciated that the relative sizes, shapes and positions of the various layers may vary between embodiments; thus, illustrated side views and/or cross-sectional views in the figures are examples only. A layer of ITO 28 may be located on the back exterior surface of thin film transistor glass layer 29 and between glass layer 29 and the rear polarizing layer 31 in the LCD panel. Referring to FIG. 1, ITO layer 28 may be deposited between glass layer 14 and polarizing filter film 15. In FIG. 6, color filter array 32 is also shown adjacent to thin film transistor layer 29. The active portion of the layer of indium tin oxide 28 which is deposited on the back of thin film transistor layer 29 defines a reference plane or region, as will be described below, and is electrically connected to a controller 33 in an electronic device.

Figure 7:
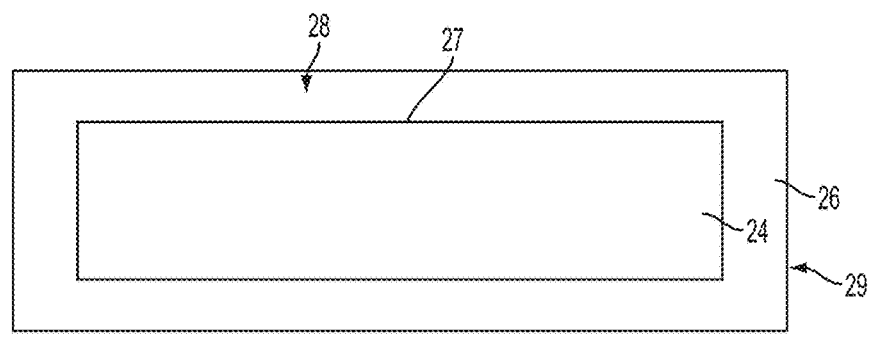
FIG. 7 shows one embodiment of a non-sensing region and reference plane area on a touchscreen.

Referring to FIG. 7, once ITO layer 28 is deposited on the surface of glass layer 29, interface area 27 may be generated. That is, the portion of layer 28 which will correspond to non-sensing region 24 may be electrically isolated from the portion of layer 28 which corresponds to reference plane area 26. Interface area 27 may be created by sputtering, photolithography, masking, laser etching, chemical etching, or any other combination of deposition, masking or material ablation or removal. While indium tin oxide (ITO) has been disclosed in one embodiment, layer 28 may be silver nanowire or any other electrically conductive optically transparent material known in the art.

Figure 8:
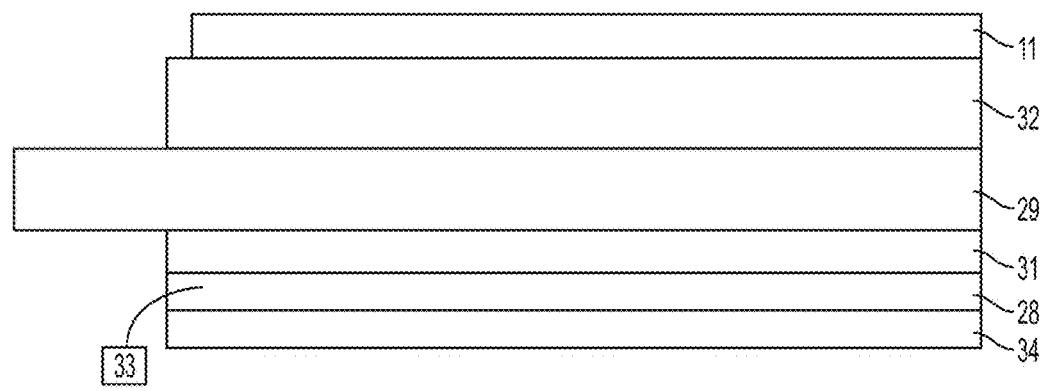
FIG. 8 shows a side view of an alternate embodiment including a transparent layer having an optically transparent electrically conductive surface on the rear surface of an LCD.

Referring to FIG. 8, a side view of an alternate embodiment of an LCD assembly is shown. In this embodiment, the patterned conductive ITO layer 28 may be deposited on a separate layer 34 made of polymer, glass or other transparent material. Layer 34 may then be affixed to the outside of rear polarizing layer 31 on the LCD panel. This rear polarizing layer 31 may correspond to polarizing film layer 15 in FIG. 1. Thus, in this embodiment, layer 34 may be affixed to the rear of the LCD panel. The LCD panel assembly in FIG. 8 also includes thin film transistor glass layer 29 in the LCD panel and color filter array 32 shown adjacent to thin film transistor layer 29. Front polarizing layer 11 is shown adjacent to color filter array layer 32. Referring to FIG. 1, in this embodiment, ITO layer 28 is deposited on glass layer 34 and layer 34 is affixed to the rear of LCD panel behind reflective layer 16 and in front of the capacitive array as will be described below. Reference plane outer ring area 26 is connected to controller 33 as previously described.

Figure 9:
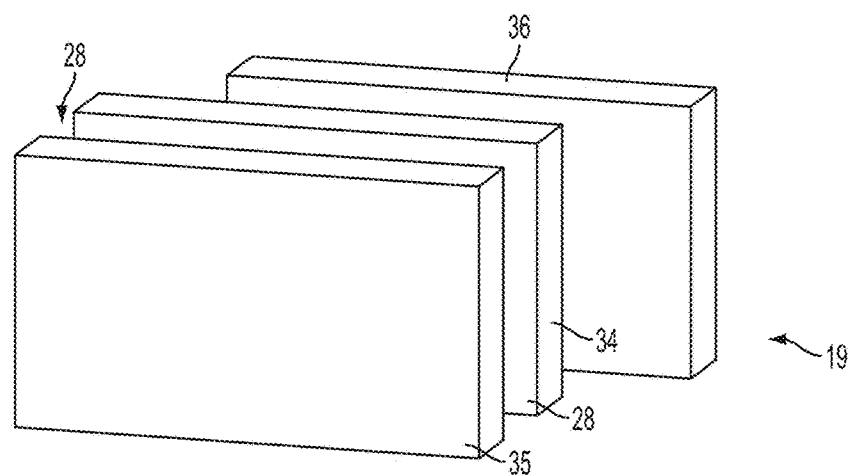
FIG. 9 shows a perspective view of an alternate embodiment including a transparent layer sandwiched between an LCD and a capacitive array.

Referring to FIG. 9, a perspective view of touchscreen 19 is shown including an LCD panel 35 and a capacitive array 36. LCD panel 35 may be the LCD panel shown in FIG. 1 and capacitive array 36 may be the array described in FIG. 2, depending upon the embodiment. That is, as discussed above with respect to FIGS. 6 and 8, conductive ITO layer 28 may be positioned on a separate layer 32 between conventional LCD panel 35 and conventional capacitive array 36 as in FIG. 8 or it may be deposited onto thin film transistor layer 29 in the modified LCD panel as described in FIG. 6. Both embodiments are illustrated in FIG. 9 although it can be appreciated that only one of these embodiments is employed at any one time. In either embodiment, ITO layer provides electrical isolation for an area of LCD panel 35 from the electrostatic fields generated within capacitive array 36 due to the changes in capacitance generated by movement of user finger 21 or other device on the screen of LCD panel 35.

Figure 10:
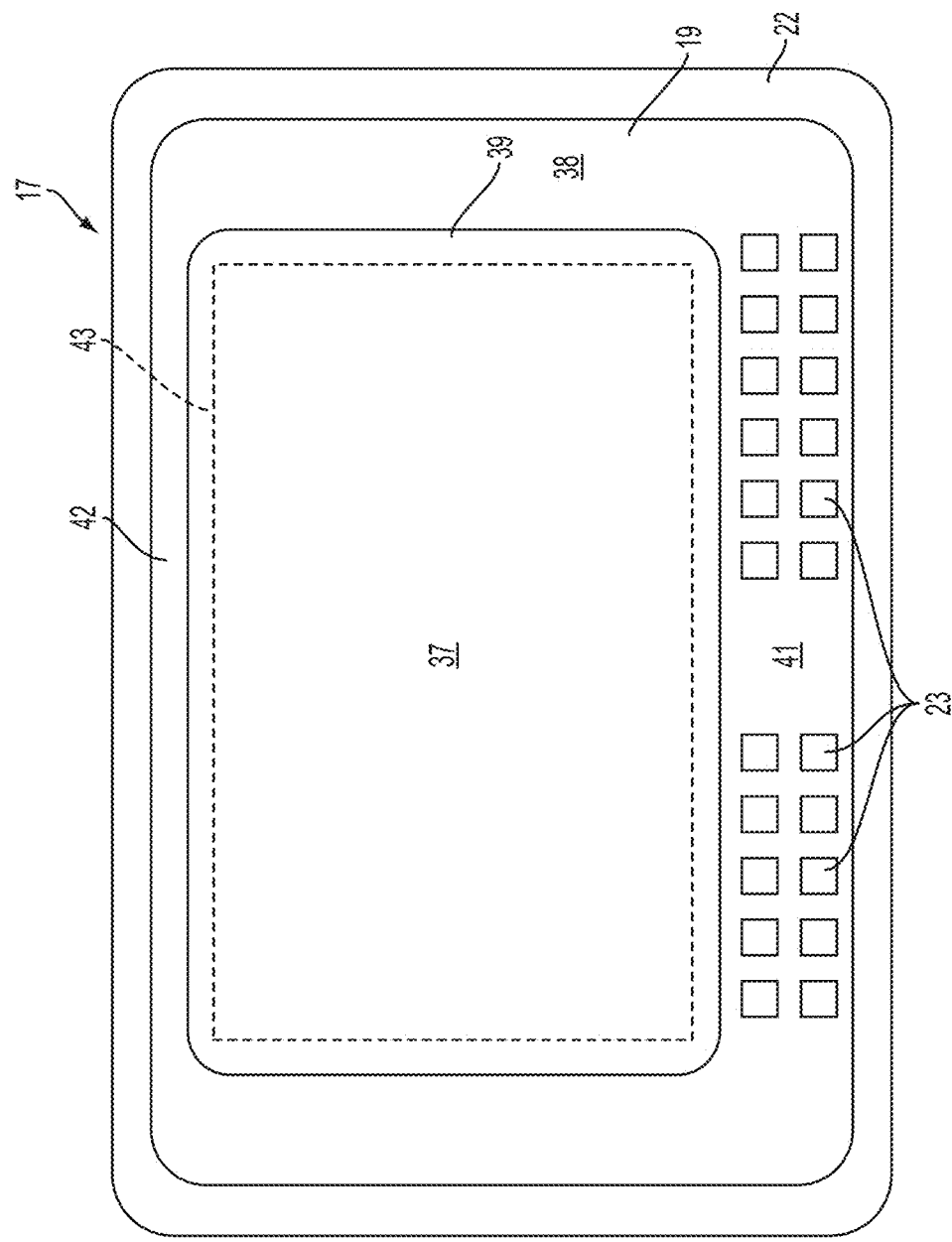
FIG. 10 shows an alternate embodiment configuration of a non-sensing region and reference plane area on a touchscreen.

Referring to FIG. 10, tablet 17 is shown including touchscreen 19. Touchscreen 19 is mounted in housing 22. In one embodiment, touchscreen 19 includes a non-sensing region 37 surrounded by a capacitive sensing area 38 that is part of an active reference plane 39. That is, in this embodiment, non-sensing region 37 is electrically isolated from capacitive array behind the LCD screen such that the visual display on non-sensing region 37 does not include optical artifacts introduced by electrical interference from the capacitive array behind LCD. This embodiment differs from that shown in FIG. 5 in that non-sensing region 37 is not centered on touchscreen 19. The portion 41 of capacitive sensing area 38 below the non-sensing region 37 is larger than the portion 42 of capacitive sensing area 38 above non-sensing region 37. In this embodiment, the larger area 41 allows the inclusion of additional icons 23 as opposed to the embodiment shown in FIG. 5. That is, area 41 provides a larger active working area while permitting the viewable screen portion to remain approximately the same size as in FIG. 5. As with other embodiments, the delineation between the non-sensing region 37 and capacitive sensing area 38 si shown for purposes of illustration and may not be visible in a physical device.

In the embodiment shown in FIG. 10, user 18 may activate icons 23 on capacitive sensing area 38/41 of touchscreen 19; the icon activation may be determined through either touch sensing or localized force sensing. As with the embodiment shown in FIG. 5, icons 23 are only present on area 38/41 and are not present on non-sensing region 37. If a user's finger 21 contacts non-sensing region 37 the capacitance of the user's finger 21 may couple to the capacitive array behind non-sensing region 37, but that array is not powered and so does not output any signal to indicate a touch or force. Further, in some embodiments, the user's finger may be electrically shielded from the array in the non-sensing region 37.

By contrast, in capacitive sensing area 38 surrounding non-sensing region 37 there is no electrical shielding and the sensing array is active (e.g., powered), such that the capacitance of the user's finger 21 contacting the capacitive sensing area 38 on touchscreen 19 is sensed by the capacitive array as described above. Capacitive sensing area 38 is part of an active reference plane 39 that is defined by the electrical isolation of non-sensing region 37 from the capacitive array.

The creation of the active reference plane area 39 and the non-sensing region 37 on touchscreen 19 results in an interface area 43 which is the boundary between reference plane area 39 and non-sensing region 37 as was described above with reference to FIG. 5. As with the embodiment described in FIG. 5, the active reference plane areas 39 of the conductive material behind the LCD display which are actively powered for use in the capacitive sensor array are electrically isolated from adjacent areas of conductive material under viewable area 37. The ITO layer 28, which is deposited on the back of thin film transistor layer 29 in FIG. 6 or on glass layer 34 in the embodiment shown in FIG. 8, is the same. However, as with the embodiment described in FIG. 7, once ITO layer 28 is deposited on the surface of glass layer 29 or glass layer 34, the interface area 43 may be generated. That is, the portion of ITO layer 28 which will correspond to non-sensing region 37 may be electrically isolated from the portion of layer 28 that corresponds to reference plane area 39. Interface area 43 may be created by sputtering, photolithography, masking, laser etching, chemical etching, or any other combination of deposition, masking or material ablation or removal.

Figure 11:
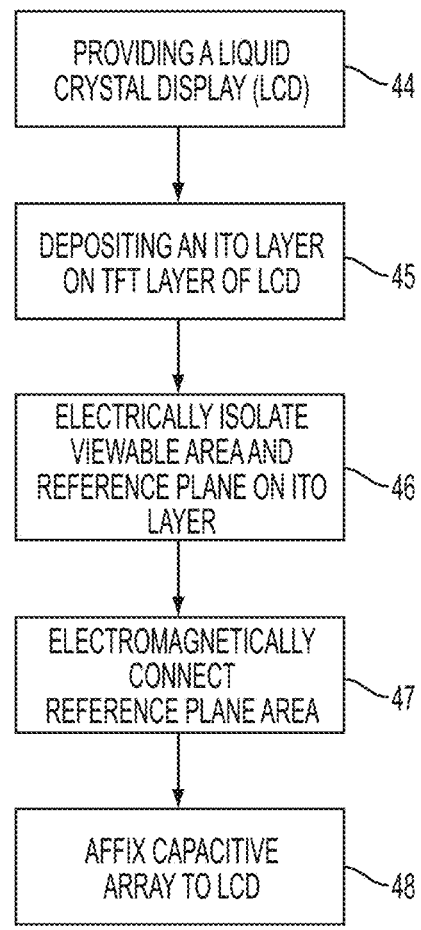
FIG. 11 is a flow chart illustrating the touchscreen manufacturing steps according to one embodiment.

Referring to FIG. 11, a flow chart is shown illustrating the steps for manufacturing a touchscreen according to one embodiment. Referring to FIG. 11, Liquid Crystal Display (LCD) is provided at step 44. An optically transparent electrically conductive layer of material, which may be Indium Tin Oxide (ITO) in one embodiment, is deposited on the thin film transistor (TFT) layer of the LCD in step 45. In step 46, a portion of the ITO layer is then removed, etched, ablated, or the like, as described above, to electromagnetically isolate a reference plane area and a non-sensing region on the TFT layer. Step 46 results in electromagnetically isolating the reference plane area from the non-sensing region on the TFT layer. In step 47, the reference plane area is electrically connected to the controller in the electronic device system such that the reference plane area is active and a user's touch may be sensed by the capacitive array. In step 48, the LCD is affixed to a capacitive array to complete the touchscreen. As described above, step 46 may result in a centered viewable area as described in FIGS. 5 and 7 or it may result in an offset viewable area as described in the embodiment described in FIG. 10.

Figure 12:
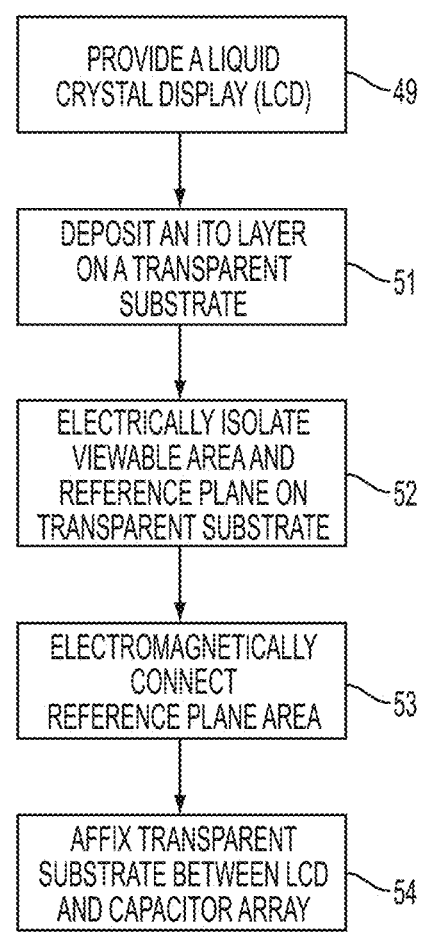
FIG. 12 is a flow chart illustrating the touchscreen manufacturing steps according to an alternate embodiment.

Referring to FIG. 12, a flow chart is shown illustrating the steps for manufacturing a touchscreen according to another embodiment. Referring to FIG. 12, Liquid Crystal Display (LCD) is provided at step 49. An optically transparent electrically conductive layer of material, which may be Indium Tin Oxide (ITO) in one embodiment, is deposited on an optically transparent separate layer made of polymer, glass or other transparent material as described above. In step 52, a portion of the ITO layer is then removed, etched, ablated, etc. as described above to define a reference plane area and a non-sensing region on the layer as was described in step 46 above. This results in electromagnetically isolating the reference plane area from the non-sensing region on the transparent layer. As described above, step 52 may result in a centered viewable area as described in FIGS. 5 and 7 or it may result in an offset viewable area as described in the embodiment described in FIG. 10. In step 53, the reference plane area is electromagnetically connected to the controller in the electronic device such that the reference plane area is active and a user's touch may be sensed by the capacitive array. In step 54, the optically transparent layer is sandwiched between the LCD and the capacitive array to complete the touchscreen.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A touchscreen comprising:
  a liquid crystal display having an upper surface area and a lower surface area;
  a capacitive array adjacent said lower surface area;
  an optically transparent electrically conductive layer deposited between said lower surface area and said capacitive array, said layer including:
    a first area electrically isolating said liquid crystal display and said capacitive array, said first area including less than said upper surface area, and a second area permitting electrical transmission between said upper surface area and said capacitive array.

2. The touchscreen of claim 1 wherein said optically transparent electrically conductive layer includes indium tin oxide.

3. The touchscreen of claim 1 wherein said optically transparent electrically conductive layer includes silver nanowire matrix.

4. The touchscreen of claim 1 wherein said optically transparent electrically conductive layer is deposited on a thin film transistor layer in said liquid crystal display.

5. The touchscreen of claim 1 wherein said optically transparent electrically conductive layer is deposited on a transparent substrate between said liquid crystal display and said capacitive array.

6. The touchscreen of claim 1 wherein said first area and said second area are separated by an interface area formed on said optically transparent electrically conductive layer.

7. The touchscreen of claim 1 wherein said second area is electromagnetically connected to a processor, thereby facilitating detection of an object adjacent the liquid crystal display and above the second area.

8. An electronic device comprising:
  a housing;
  a touchscreen in said housing, said touchscreen including:
    a liquid crystal display having an upper surface area and a lower surface area;
    a capacitive array beneath said lower surface area;
    an optically transparent electrically conductive layer deposited between said lower surface area and said capacitive array, said layer including: a first area less in size than said upper surface area, and a second area electrically isolated from the first area, the second area operative to capacitively sense an object adjacent the touchscreen.

9. The electronic device of claim 8 wherein said optically transparent electrically conductive layer includes one of indium tin oxide and silver nanowire.

10. The electronic device of claim 8 wherein said optically transparent electrically conductive layer is deposited on a thin film transistor layer in said liquid crystal display.

11. The electronic device of claim 8 wherein said optically transparent electrically conductive layer is deposited on a transparent substrate between said liquid crystal display and said capacitive array.

12. The electronic device of claim 8 wherein said first area is approximately centered within said second area.

13. The electronic device of claim 8 wherein said first area is offset within said second area.

14. The electronic device of claim 8 wherein said first area and said second area are separated by an interface area formed on said optically transparent electrically conductive layer.

* * * * *